(12) United States Patent
Mitchell et al.

(10) Patent No.: US 8,873,964 B2
(45) Date of Patent: *Oct. 28, 2014

(54) OPTICAL AUTODISCOVERY FOR AUTOMATED LOGICAL AND PHYSICAL CONNECTIVITY CHECK BETWEEN OPTICAL MODULES

(75) Inventors: Matthew L. Mitchell, Sunnyvale, CA (US); Robert B. Taylor, Charleston, SC (US); Alan C. Nilsson, Mountain View, CA (US); Steven Joseph Hand, San Jose, CA (US); Daniel P. Murphy, Ben Lomond, CA (US)

(73) Assignee: Infinera Corporation, Sunnyvale, CA (US)

(*) Notice: Subject to any disclaimer, the term of this patent is extended or adjusted under 35 U.S.C. 154(b) by 724 days.

This patent is subject to a terminal disclaimer.

(21) Appl. No.: 13/017,779

(22) Filed: Jan. 31, 2011

(65) Prior Publication Data

US 2011/0243552 A1 Oct. 6, 2011

Related U.S. Application Data

(62) Division of application No. 11/427,319, filed on Jun. 28, 2006, now Pat. No. 7,881,612.

(60) Provisional application No. 60/695,508, filed on Jun. 30, 2005.

(51) Int. Cl.
*H04J 14/02* (2006.01)

(52) U.S. Cl.
CPC ......... *H04J 14/0227* (2013.01); *H04J 14/0276* (2013.01); *H04J 14/0265* (2013.01); *H04J 14/0264* (2013.01); *H04J 14/0275* (2013.01); *H04J 14/0241* (2013.01); *H04J 14/0221* (2013.01); *H04J 14/0258* (2013.01)
USPC .................... 398/95; 398/14; 398/33; 398/79

(58) Field of Classification Search
USPC ........... 398/34, 14, 25, 33, 23, 24, 30, 32, 79, 398/22, 151, 156, 162, 82, 91, 95, 119, 122, 398/128, 129, 130, 131, 140, 141, 153
See application file for complete search history.

(56) References Cited

U.S. PATENT DOCUMENTS

| 5,461,693 | A | 10/1995 | Pimpinella |
| 5,828,669 | A * | 10/1998 | Yamamoto .................... 370/412 |
| 6,301,031 | B2 * | 10/2001 | Li ..................................... 398/9 |
| 6,559,984 | B1 | 5/2003 | Lee et al. |
| 6,920,288 | B2 | 7/2005 | Adleman et al. |
| 6,925,266 | B1 * | 8/2005 | Muller .......................... 398/196 |

(Continued)

*Primary Examiner* — M. R. Sedighian
(74) *Attorney, Agent, or Firm* — David L. Soltz

(57) ABSTRACT

Optical autodiscovery is provide between two optical modules to insure that when an optical signal is coupled between the two optical module, the optical signal from a first module does not interfere with operation of a second module. The autodiscovery is implemented by sending an optical identification signal from the first optical module via the coupling to the second optical module from which signal, the second optical module can verify and determined acceptance of the coupled first optical module. During this autodiscovery process, the optical identification signal from the first optical module may be attenuated or shifted in optical spectrum so as not to interfere with the operation of the second optical module. Autodiscovery may also be employed in cases where a first optical module is to receive an optical signal from a second module.

8 Claims, 8 Drawing Sheets

(56) References Cited

U.S. PATENT DOCUMENTS

| | | |
|---|---|---|
| 7,068,943 B2 | 6/2006 | Korolev et al. |
| 7,113,700 B2 * | 9/2006 | Shimizu et al. ............ 398/33 |
| 7,158,728 B2 | 1/2007 | Kasahara et al. |
| 7,747,165 B2 | 6/2010 | Emery et al. |
| 7,881,612 B2 * | 2/2011 | Mitchell et al. ............ 398/34 |
| 2002/0118425 A1 | 8/2002 | Dove et al. |
| 2002/0171889 A1 | 11/2002 | Takeuchi |
| 2002/0191241 A1 | 12/2002 | Emery et al. |
| 2003/0061393 A1 | 3/2003 | Steegmans et al. |
| 2003/0095737 A1 | 5/2003 | Welch et al. |
| 2003/0177213 A1 | 9/2003 | Wallace et al. |
| 2004/0179836 A1 | 9/2004 | Yamaguchi et al. |
| 2005/0074244 A1 * | 4/2005 | Roberts et al. ............ 398/139 |
| 2005/0276613 A1 | 12/2005 | Welch et al. |

* cited by examiner

OPTICAL AUTODISCOVERY FOR AUTOMATED LOGICAL AND PHYSICAL CONNECTIVITY CHECK BETWEEN OPTICAL MODULES

REFERENCE TO RELATED APPLICATION

This application is a divisional of application Ser. No. 11/427,319, filed Jun. 28, 2006, now U.S. Pat. No. 7,881,612 which claims priority to provisional application Ser. No. 60/695,508, filed Jun. 30, 2005, both of which applications are incorporated herein by reference in their entirety.

INVENTORY OF TERMINOLOGY TERMS

BMM—Band Multiplexer Module. There may be one for C Band and one for the L Band.

Channels—A signal channel that minimally includes a modulated source. The channel may be in discrete form or in integrated form. In integrated form in a TxPIC, there is a plurality of modulated signal channels each having a modulated source of different emission wavelength. The outputs of the signal channels are coupled to an integrated combiner which provides a combined output signal of the channel signals.

DLM—Digital Line Module. A substantially line side module that includes a PIC module having a TxPIC and RxPIC.

EMS—Element management system basically comprising software to operate a management and control module (MCM).

MCM—Management and Control Module is responsible for operating network elements (NEs) and the communication between network elements.

Modulated sources—With reference to a TxPIC comprises a modulated semiconductor laser or a continuous wave (cw) laser integrated with an external modulator. The laser may be, for example, a distributed feedback (DFB) laser or a distributed Bragg reflector (DBR) laser. Examples of an external modulator are electro-absorption modulator (EAM) or a Mach-Zehnder modulator (MZM).

NE—Network element in an optical transport or transmission network.

OCG—Optical Channel Group. OCG has particular reference to the group of combined or multiplexed channel signals at the output of a TxPIC.

OSC—Optical supervisory channel for optical signals that provide, as one example, communication between network elements.

PIC—Photonic Integrated Circuit. A plurality of optical elements integrated on a single semiconductor substrate, such as a Group III-V substrate, e.g., InP substrate, or on a polymer substrate. A planar lightwave circuit (PLC) is sometimes referenced as a PIC but a PLC generally has reference to a plurality of optical active and/or passive elements that are aligned and/or butt joined together in an optical communal relationship.

RxPIC—Receiver Photonic Integrated Circuit. The circuit comprises a circuit-integrated demultiplexer with a plurality of outputs to an integrated array of photodetectors (PDs).

TxPIC—Transmitter Photonic Integrated Circuit. The circuit comprises a plurality of integrated signal channels with inputs provided to a circuit-integrated multiplexer.

WDM—Wavelength Division Multiplexing—Concurrent transmission of optical data on a plurality of different wavelengths in a given direction. WDM herein is intended to include dense wavelength division multiplexing (DWDM).

BACKGROUND OF THE INVENTION

This invention relates to autodiscovery relative to optical network modules and more particularly to optical autodiscovery between two optical or electro-optical modules employed in a network element of an optical transmission network.

In optical transmission equipment, many equipment manufacturers or vendors authenticate card placement in the equipment chassis by electronically monitoring via the overall network manager or element management system (EMS) in the equipment of network element. EMS is software that manages the network element (NE), which software here is what we refer to as network management software in a management and control module (MCM). It is known in such equipment to apply electronic autodiscovery to determine if a module card has been place in the correct slot in the equipment chassis in a network element and/or if the module card is electrically working properly. However, the technique of electronic monitoring does not and cannot provide a guarantee that the optical paths connecting optical module line cards or optical modules, for example, have been properly connected by a technician or operator upon their installation. A typical optical line side network card in an optical transceiver provides for optical signal generation and optical signal reception of optical client signals from an optical transmission link. These optical client signals are generally generated on the line card side of the transmission equipment but can also be generated on the client or customer-connected side of the network element equipment as well. We refer to the optical modules that includes these optical transmitters and optical receivers as a digital line module (DLM) which includes a plurality of optical signal channels each designed to respectively generate or receive an optical client signal where the optical signals are of different wavelengths so that these signals are then combined and decombined, as the case may be, such as via wavelength division multiplexing (WDM). When a set of optical channel signals from a plurality of signal channels are combined, such as via optical multiplexing, we call the resultant WDM signal an optical channel group (OCG).

The lack of the aforementioned optical module connectivity guarantee is a particular problem where an optical module is improperly connected to another optical module port via an optical cable or fiber in network element equipment chassis. For example, the connected optical module may include another OCG that contains channel signals, for example, that are already present in another optical module that has been previously connected or provisioned in the network element equipment. There are many optical connectors and ports on the front of the equipment chassis and it is not uncommon for the technician to incorrectly interconnect an optical cable, which is also referred to in this disclosure as optical patching, between optical modules. Such incorrect optical cabling or patching is not electronically detectable. Such an incorrect optical connection between first and second optical modules may result in incapacitating other provisioned and working optical signal channels through coherent crosstalk, particularly if one or more of the signal wavelengths of the incorrectly first optical module are identical with one of the signal wavelengths already installed or provisioned to the second optical module. If the error is not detected in advance of optical patching of such incorrect optical patching, the ongoing traffic through the second optical module will be corrupted.

What is needed is some way of optical detection signaling, such as optical autodiscovery, to check for proper optical connectivity, or the lack thereof, which would add significant benefit in booting up WDM network element equipment or permit the network to continually operate without impairment when adding a new optical module into equipment chassis at a network element.

SUMMARY OF THE INVENTION

According to this disclosure, optical autodiscovery is provided between two optical modules where if an optical output signal from a first optical module, such output signal comprising, for example, an information modulated signal, is coupled through a module port of a second optical module, such as via an optical patching. The optical output signal from the first optical module is initially attenuated or its wavelength or wavelength bandwidth is spectrally shifted until the second optical module is able to authenticate that the first optical module is a proper module for connection to the second optical module via a second module port. How this authentication is accomplished is explained below. The attenuation can be applied by an element either at the first optical module or the second optical module or a combination of both modules. In the embodiments shown here, attenuation or wavelength or wavelength band shifting is illustrated as initiated in the first optical module. If the identity of the first optical module is confirmed as proper, then the first optical module receives an acceptance from the second optical module and the first module is allowed to remove the attenuation from its output signal or spectrally re-shift the its wavelength or wavelength bandwidth to its proper spectral position, as the case may be. In the case of attenuation, therefore, a full power output signal is allowed to be provided to the second module port. We refer in this disclosure to the first optical module as an "aggressor" module and we refer to any previously connected or patched optical modules to the second optical module as a "victim" or "victims".

There are three primary situations where authentication between first and second optical modules is desired. First, connecting a first optical module to an incorrect port of a second optical module. Second, connecting a first optical module to an incorrect second optical module or vice versa. Third, connecting a first optical module of a first product generation to a second and incorrect optical module of a second product generation or vice versa.

In the first situation, there are two possible scenarios. In the first scenario, a first optical module is patched to an incorrect port of a second optical module where the second optical module is correct for the first optical module. The autodiscovery provisioning in this scenario is called pre-provisioning where the second optical module expects to find the first optical module patched at a particular port of the second optical module. In the second scenario, the first optical module is "correct" for a given module port of the second optical module but is still incorrect because another first optical module has already be provisioned for that given port through previous autodiscovery with that particular earlier provisioned first optical module. The autodiscovery provisioning in this scenario is called auto-creation which allows any first optical module of a first predetermined optical signal or optical channel group (OCG) signal to be provisioned to a predetermined port of the second optical module. However, once an appropriate first optical module has been associated with the predetermined port of the second optical module, then, the second optical module will not accept any other first optical module into that port even if another such first optical module has the same optical signal type or OCG signal type. This second scenario prevents the situation from occurring where, for example, during equipment chassis replacement, the placement or patching of the incorrect first optical module, having a first predetermined optical signal or OCG signal and a first module superimposed first ID signal, with an incorrect second optical module that already previously provisioned an identical first optical module with a first module superimposed second ID signal having the same first predetermined optical signal or OCG signal. In exemplary examples in this disclosure, reference will be primarily made to the first situation. However, it should be realized that the second and third situations are equally applicable to the principals explained in this disclosure.

It should be realized, at this point, that the identify of the first optical module is usually accomplished by module identification rather than by optical signal or OCG signal identification, or by both module identification and optical signal or OCG signal identification. However, the principals of this disclosure can be equally extended to identification through optical signal or OCG signal identification rather than a particular first module.

Also, the principals of this disclosure can be extended to the identification as to a proper optical module connection may be the identification of the second optical module by the first optical module where the first module identifies the second module as an incorrect second optical module. This is particularly true in the case where the first optical module not only transmits, via patching, an optical signal or an OCG signal to the second optical module, but also in the second optical module transmits, via patching, an optical signal or an OCG signal to the second optical module that are proper for that module. Such a particular case is where the first optical module is an optical transceiver. However, the need of identification of the second optical module by the first optical module can be resolved by employing a duplex fiber connection for patching which allows checking for proper module identification in only one transmit direction between the first and second optical modules under the assumption that the other or opposite transmit direction is the same for the dual fiber port at the second optical module.

The identity of the first optical module may come from the first module to the second optical module and may be in the form of an additional modulated signal superimposed on the first module optical output signal, whether a single optical signal or an OCG signal, with a modulation frequency that is spectrally different from any other data modulation signals appearing on the first module optical output signal. Alternatively, the optical signal identifying the first optical module may be in the form of a separate modulated identification optical signal added to (such as multiplexed) or separate from the first module optical output signal. The first module output signal may further be a plurality of modulated signals, e.g., an optical channel group (OCG) WDM signal of a plurality of optical channel signals from a plurality of optical modulated sources, or may be a plurality of different optical channel group (OCG) signals combined or interleaved together at the first optical module.

Optical signal identification of the first optical module is provided through the optical fiber connection or optical cable to the second optical module, which connection is also referred to as optical patching, between, for example, an optical first module comprising an optical channel group (OCG) transceiver or a group of OCG transceivers in a digital line module (DLM) and a companion optical second module called a band MUX/DEMUX module (BMM), for banding and disbanding such optical channel groups (OCGs) from one another. The connectivity check of this disclosure provides a DLM/BMM authentication process which is accomplished without harming other operating optical signal channels in other optical channel groups (OCGs) already coupled, authenticated and provisioned from a DLM to a BMM if, indeed, the DLM/BMM connection that is to be patched turns out to be an improper optical patched connection.

This invention, therefore, can be utilized as an optical autodiscovery technique in any situation where two optical modules are being coupled together in any optical transmission system, including, but not limited to, optical transport networks or local area networks, particularly where there is a danger of causing faulty operation to optical signals already coupled or provisioned between two such modules.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DETAILED DESCRIPTION OF DISCLOSURE EMBODIMENTS

Figure 1:
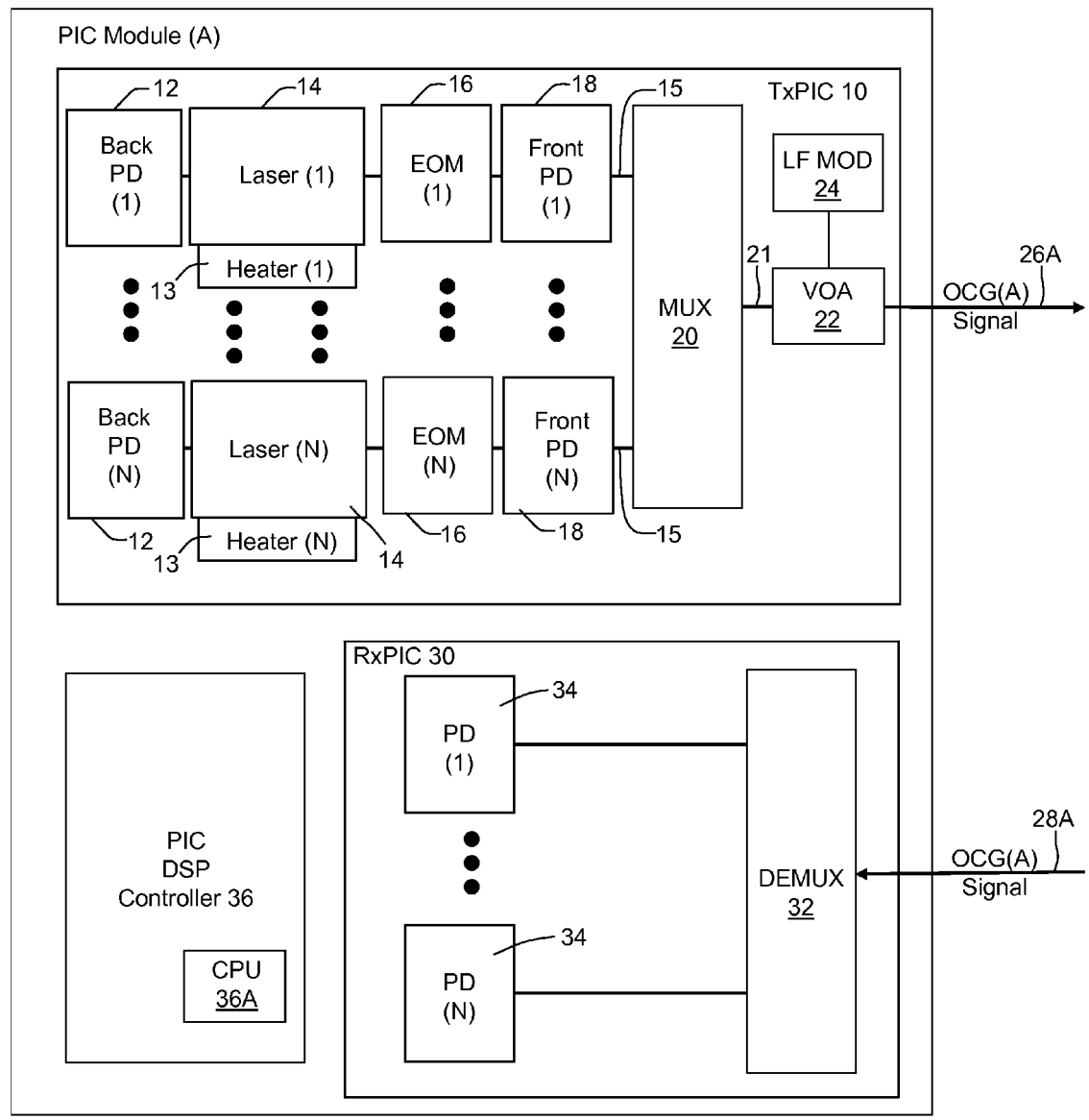
FIG. 1 is a schematic illustration of a transceiver module comprising a single TxPIC/RxPIC module that is within a digital line module (DLM) in an optical transmission network.
Figure 2A:
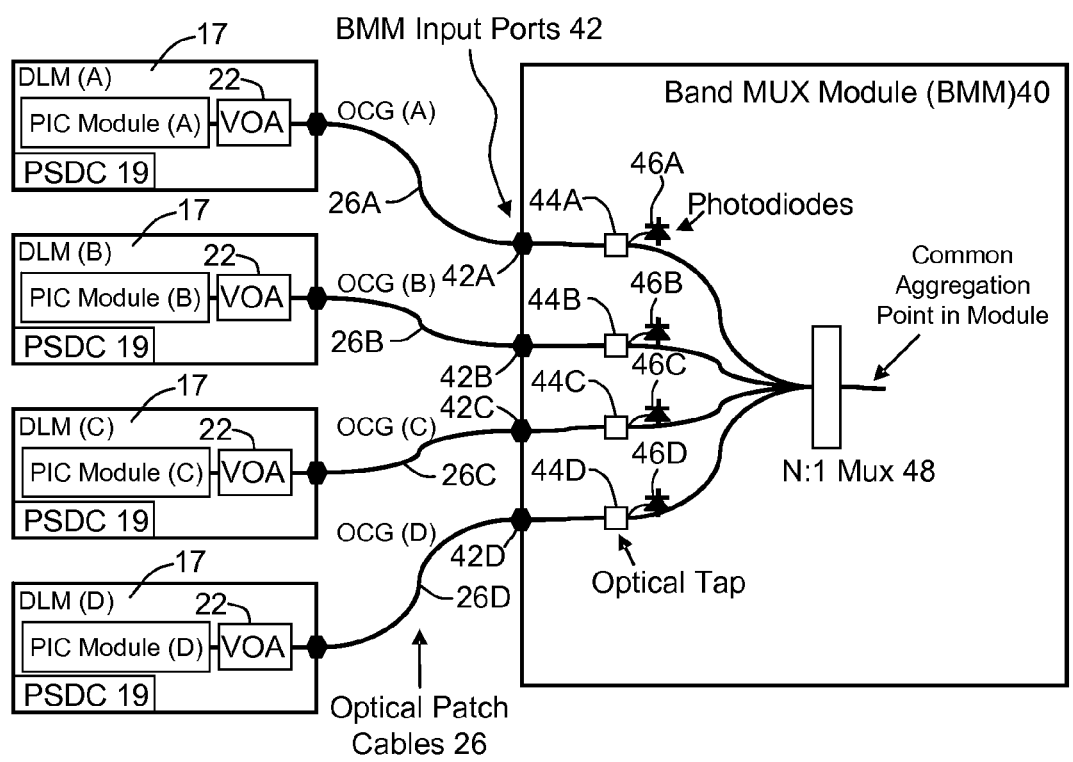
FIG. 2A is a schematic illustration of a plurality of digital line modules (DLMs) coupled to input/output ports of a band multiplexer (MUX) module (BMM).

Before delving into the optical autodiscovery embodiments of this disclosure, an explanation of the exemplary modules in the implementation of the disclosed embodiments should be first explained. Reference is first made to FIG. 1 which discloses a photonic integrated circuit (PIC) group designated as PIC module A. PIC module A comprises a chip set of two PIC chips. Although the chip circuits could, alternatively, be integrated on a single chip. The transmitter PIC or TxPIC chip 10 contains a group of optical signal channels (1) to (N) where each channel 15 minimally includes a laser 14 and an electro-optical modulator (EOM) 16. The lasers (1) . . . (N) may each have an associated heater 13 which is control via a wavelength locker (not shown) to maintain a peak wavelength forming a wavelength grid of signal channels 15 across the channel array of TxPIC 10. Each channel 15 may include additional electro-optic elements, such as shown here comprising back and front monitoring photodetectors (PDs) 12 and 18. The modulated signal output from each optical channel 15 in TxPIC 10 is combined via MUX 20 into a WDM signal referred to as an optical channel group (OCG) providing a WDM output OCG(A) signal at 21 which is then provided to an output cable 26A (FIG. 2A). MUX 20 may be an arrayed waveguide grating (AWG) or an Echelle grating, but also can be a free space coupler or a multi-mode interference (MMI) coupler. Further details of TxPIC 10 can be seen in published Application No. US 2003/0095737 A1, published on May 22, 2003, which is U.S. nonprovisional patent application Ser. No. 10/267,331, filed on Oct. 8, 2002, which application is incorporated herein by its reference.

An important aspect of this disclosure is that the OCG output signal at 26A from the multiplexer 20, as shown in FIG. 1, passes through an optical signal attenuator, shown here as a variable optical attenuator (VOA) 22. Also, a low frequency modulator (LF MOD) 24 is coupled to attenuator 22 to modulate any output at 26A with a communication signal to be provided to BMM 40. With reference to FIG. 2A, attenuator 22 is employed in conjunction with optical autodiscovery to initially attenuate OCG(A) signal on cable 26A when cabled to a BMM port 42A so as not to optical interfere with other previously connected OCG signals, such as, for example, OCG(B), OCG(C) or OCG(D), already optically patched to band multiplexer module (BMM) 40 already optically patched to other digital line modules or DLM (B), DLM (C) or DLM (D), respectively, via other BMM input/output ports 42B, 42C or 42D, until such a cabled OCG signal, here, the OCG(A) signal on cable 26A, is, first, authenticated as a proper combined signal to be optically coupled to a particular BMM input/output port 42. For example, improper optical patching or cabling of a TxPIC output OCG signal from its corresponding DLM with at least one signal wavelength substantially identical to a signal wavelength of already provisioned within an OCG signal from another DLM, previously, optically patched to BMM 40, would wash out those identical wavelength signals. Therefore, it is important to make sure that identical spectral signals are not accidentally provided to the same BMM 40 which has the function combining together the plural OCGs.

The PIC output VOA 22 may be integrated on the same semiconductor substrate as all the other integrated elements 12, 14, 16, 18 and 20 of TxPIC 10 or it may be a separate optical component, such as a MEMs VOA, optically coupled to receive the OCG output at 21. Also, as indicated above, the OCG signal in TxPIC VOA 20 may be modulated with a low frequency signal (LF) from low frequency modulator (LF MOD) 24 indicative of the identity or ID tag of a particular DLM 17 and a particular OCG. This LF signal is also provide for signal communication from a DLM 17 containing PIC module (A) and BMM 40 to authenticate that this particular DLM 17 is the proper module for connection to a particular BMM input/output port 42. In this connection, the important point here in understanding the deployment of this attenuation functionality is that the communication via a low intensity modulated signal from VOA 22 of an aggressor DLM to be connected is sufficiently low in power that it will not optically interfere with other optical signals from one or more other victim DLMs already provisioned into the BMM, even though the victim DLMs may possible include at least one signal wavelength that is identical to signal wavelength in the DLM to be connected. This is because the attenuated signal intensity from the aggressor DLM 17 is too low to conflict with any victim DLM 17 that has an OCG that includes at least one channel signal identical with that of the aggressor DLM 17.

It will be realized by those skilled in the art that this low frequency identification (ID) signal can be superimposed on optical signals elsewhere in TxPIC 10 or within the DLM 17. For example, the low frequency ID signal may be superimposed on one or more lasers 14 or on a photodetector 18 of TxPIC 10, either as positioned in a signal channel 15 or, alternatively, provided by a separated but integrated light source on TxPIC 10, or from a source separate from and outside of the integrated TxPIC 10. Furthermore, the coupling of an unauthenticated OCG signal into a particular BMM input/output port 42 could, as previously indicated, be disastrous to previously provisioned OCG signals in continuous communication with BMM 40.

Returning now to FIG. 1, PIC module (A) also includes a receiver PIC or RxPIC chip 30 comprising an input for OCG (A) signal optically patched from BMM 40 via cable 26A to a decombiner 32 where the OCG input signal is optically demultiplexed into individual channel signals which are, respectively, converted into electrical signals by an array of integrated photodetectors (1) . . . (N) at 34. Details of RxPIC 30 can be seen in published Application No. US 2004/0033004 A1, published on Feb. 19, 2004, which is U.S. non-provisional patent application Ser. No. 10/267,304, filed on Oct. 8, 2002, which application is incorporated herein by its reference.

Also, illustrated in FIG. 1 is PIC digital signal processor (DSP) controller 36 which includes a digital processor or CPU 36A. Controller 36 not only controls functionality on TxPIC 10 and RxPIC 30 but also controls the TxPIC laser wavelength locking and power control and maintains this optical circuit at their operating states. This control is maintained in spite of the fact that output VOA 22 of the DLM (A) of FIG. 2 may have been attenuated to a low intensity level to protect BMM 40 from potential optical interference with other OCG signals already provisioned to BMM 40.

Reference is again made to FIG. 2A which shows additional DLMs, to wit, DLM (B), (C) and (D) with their respective WDM OCG signals OCG (B), OCG (C), and OCG (D) patched to respective BMM ports 42B, 42C, and 42D of four port BMM 40. Each DLM 17 has a respective output attenuator or VOA 22. These four DLM output VOAs 22, as a group, perform three functions. First, they are deployed to provide power balancing among the output OCG signals across several DLMs 17 which is basically a power balance of the average power between or among a plurality of DLMs. This is the subject matter of copending patent application Ser. No. 11/425,988, filed Jun. 20, 2006, which is owned by the common assignee herein and is incorporated herein in its entirety by its reference. Second, VOAs 22 provide compensation over life in changes to the total DLM output from its respective TxPIC due to aging, for example, among other changing PIC parameters. In this regard, each signal channel on TxPIC 10 may also include an integrated VOA in each channel 15 (not shown) so that the power levels across the N channel signals of the PIC can be equalized. Third, VOAs 22 are employed for provisioning of DLMs 17 to BMM 40 by having their optical outputs initially attenuated and then modulated via LF MOD 24 to provide a low intensity communication that includes data identifying the DLM and its OCG and permitting BMM 40 to check with other resources to determined if a particular DLM 17 is the proper one to be provisioned for patching to BMM 40 at a particular BMM port 42.

Thus, each DLM 17, when patched to BMM 40, as shown in FIG. 2A, undergoes this provisioning process with their attenuated output OCG signal at 26 modulated, via VOA 22, in order to communicate directly with DSP controller 40A in BMM 40 via a low frequency modulated signal to initiate and complete an autodiscovery authentication process. After authentication has been confirmed, the output power from DLM 17 is increased to its desired higher operating level by removing at least some of the power suppression on the DLM output OCG signal which is done by reducing the applied negative bias to output VOA 22. Not all the bias is removed because some bias level may be maintained to insure that all DLM OCG outputs are power balance or have equalized power levels prior to OCG signal transfer to BMM 40. The provisioned DLM signal is then received in BMM 40 and multiplexed at N:1 MUX 48 with other OCG signals from other cabled DLMs 17. The power balancing can be accomplished with the use of taps 44 where a part of the input to BBM 40 is tapped and detected by photodetectors 46 for power level evaluation as well as signal communication with the DSP controller 63 (see FIG. 3) for autodiscovery. It should be noted that the bandwidth response of photodetectors 46 does not include the data or client frequency signals of the OCG signal from DLM 17 which are in the GHz range but rather are only responsive to the lower frequency modulation of the modulated identification signal that is superimposed on the OCG signal.

Figure 2B:
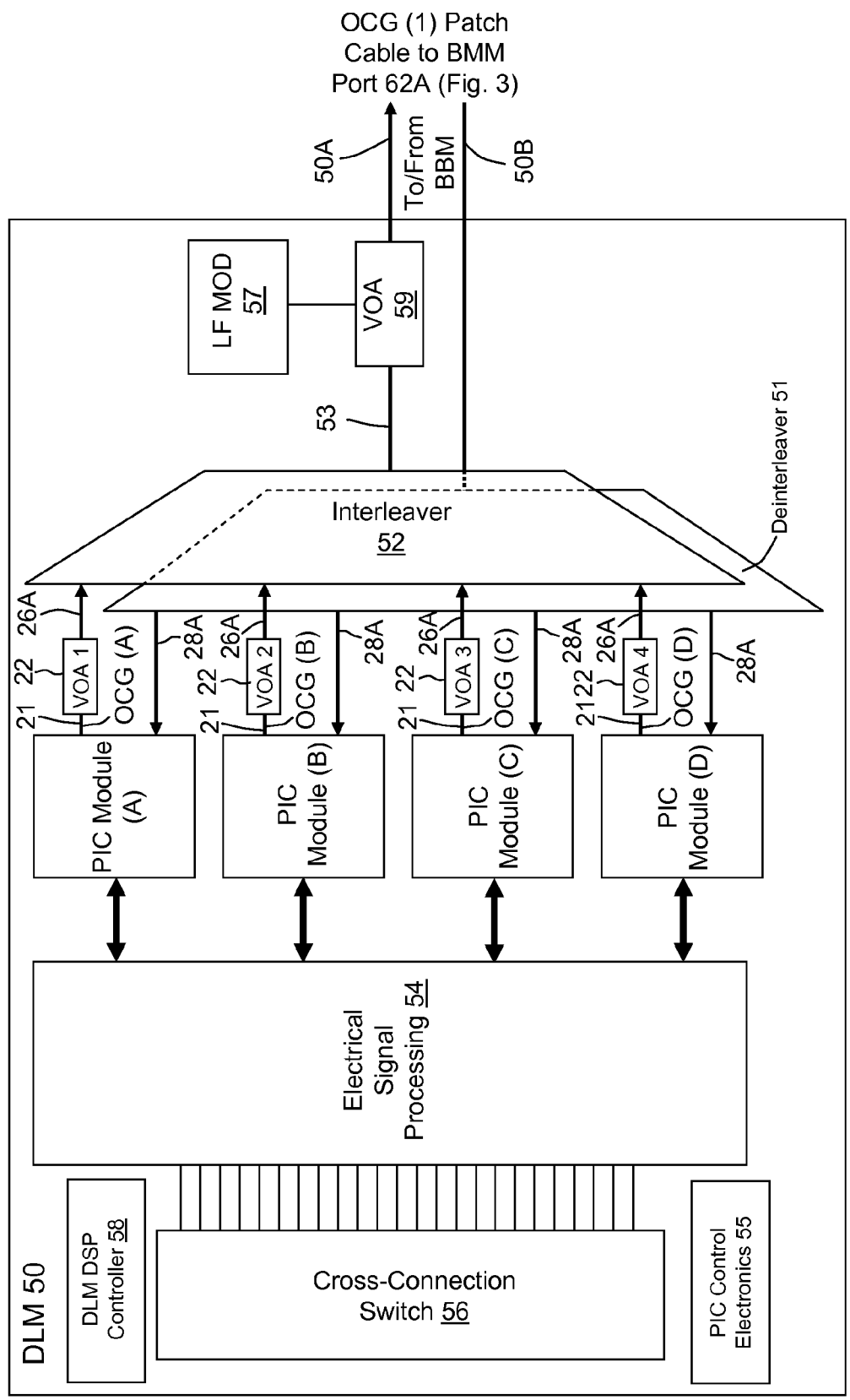
FIG. 2B is a schematic illustration of a single DLM containing a plurality of TxPIC/RxPIC (PIC) modules.
Figure 3:
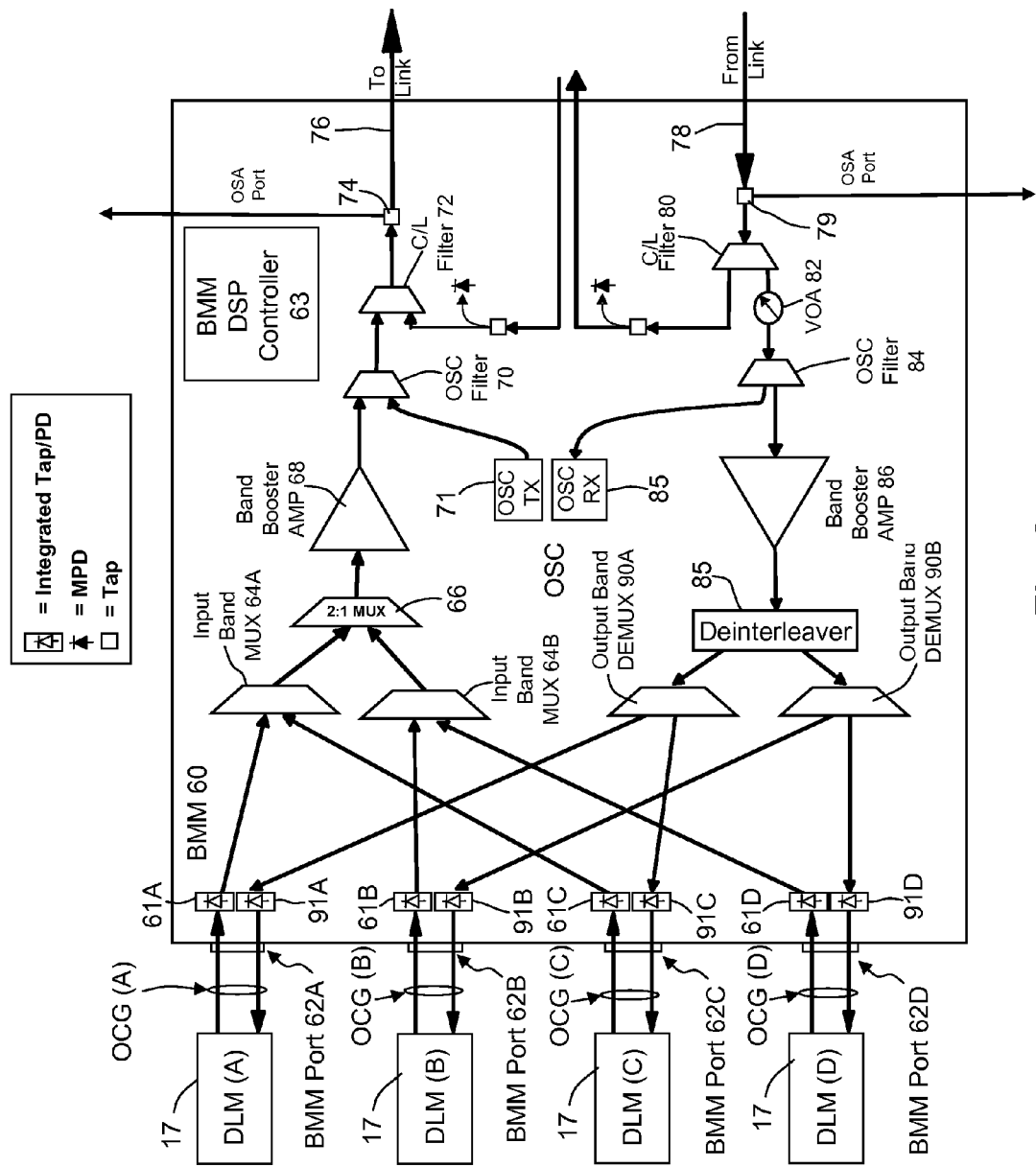
FIG. 3 is a schematic illustration of a plurality of digital line modules (DLMs) coupled to input/output ports of a BMM where the details of the BMM are disclosed.

Reference is now made to FIG. 2B, which discloses another embodiment of a DLM 50 which includes a plurality of PIC modules comprising PIC module (A), PIC module (B), PIC module (C), and PIC module (D), where each of the PIC modules are similar to PIC module (A) shown in FIG. 1. Each PIC module has its own attenuator 22, designated respectively as VOA 1, VOA 2, VOA 3, and VOA 4 on their respective PIC module outputs 21, and provide their respective outputs OCG (A), (B), (C), and (D) signals via its output VOA 22 are provided on output lines 26A to interleaver 52. Interleaver 52 interleaves the OCG signals from the four PIC modules into a single output signal provided on interleaver output 53. The combined interleaved output from interleaver 52 is provided to a DLM attenuator 59 that is optically coupled to low frequency (LF) signal modulator (MOD) 57. Thus, the interleaved signal output is provided on output line 50A as an OSG (1) signal via a patch cable to BMM 60 (FIG. 3).

Also, there is an OCG (1) signal input from the patch cable patched to BMM port 62A to input line 50B of DLM 50 to its deinterleaver 51. The transport signals from BBM 60 that are proper for OSG (1) and respective PIC modules, PIC module (A), PIC module (B), PIC module (C), and PIC module (D) are received via line 50B at deinterleaver 51 where they are deinterleaved as signal groups OCG (A), OCG (B), OCG (C), and OCG (D) and provided to respective PIC modules (A), (B), (C), and (D), via PIC input lines 28A, in the same manner indicated in FIG. 1 with respect to PIC Module (A) at RxPIC 30.

Thus, the digital line module (DLM) 50 which includes PIC Group A OCG (A) from FIG. 1 now, as well, includes three other such signal groups OCG (B), OCG (C), and OCG (D). These channel groups are also connected to operational electronics indicated as electrical signal processing at 54 which, in turn, is connected to electronic cross-connection switch 56. Switch 56 may be also connected to the electrical signal processing on one side and may be, as well, connected to other corresponding DLMs, or to optical tributaries (also called tributary adapter modules or TAMs which are not shown here) for connection to client signal transport equipment to receive from and send to client signals for transport or reception, respectively.

DLM 50 also includes PIC control electronics 55 to operate and to control the integrated electro-optic elements on the PICs in the PIC modules as well as provide wavelength locking of the lasers to predetermined peak emission wavelengths in each TxPIC. More detail of a DLM like DLM 17 can be seen in U.S. nonprovisional patent application Ser. No. 11/154,455, filed Jun. 16, 2005, which application is incorporated herein by its reference. Also, more details concerning PIC control, such as for wavelength locking including PIC control, can be seen in published application No. 2003/0095736, published on May 22, 2003, which is U.S. nonprovisional patent application Ser. No. 10/267,330, filed Oct. 8, 2002, and in U.S. nonprovisional patent application, Ser. No. 11/427,624, filed Jun. 29, 2006, all of which applications are incorporated herein by their reference. Also, DLM 50 in FIG. 2B contains a DLM DSP controller 58, similar to DSP controller 19 in FIG. 1A, to control various functioning on the module as well as participate in optical autodiscovery which will be discussed later on. It should be noted that the same electronics diagrammatically illustrated here may also employed, in part, in the embodiment of FIG. 2A.

It should be noted that it is within the scope of this invention that the PIC modules (A), (B), (C) and (D) each have a VOA, as previously mentioned in connection with PIC module A in FIG. 1, with a low frequency DLM ID signal applied via low frequency modulator (LF MOD) 24 to modulate the OCG signal from each respective PIC module passing through a respective VOA 1, VOA 2, VOA 3 and VOA 4. The modulated signal is the same low frequency modulation provided on all DLMs 17 via modulator 24 and the signal bits represent an optical ID identification signal, identifying the DLM and its signal group, which is transmitted to a BMM 60. However, as shown in FIG. 2B, all of the output OCG signals OCG (A), OCG (B), OCG (C), and OCG (D), respectively, from PIC module (A), PIC module (B), PIC module (C) and PIC module (D) are interleaved or otherwise multiplexed together to form a combined OCG (1) signal for patching, for example, to OCG input/output port 62A of BMM 60, as seen in FIG. 3. Thus, a common VOA 59 may be provided at the output of interleaver 52 for low attenuated signal communication between DLM 50 and BMM 60 in accordance with the teachings of this disclosure. However, the four VOAs 22 are still needed with the PIC modules (A), (B), (C) and (D) for output OCG signal power equalization across the PIC module array, which is the subject of Ser. No. 11/425,988, supra.

Further, it is within the scope of this disclosure as another embodiment to employ one of the VOAs 22 of a single PIC module (A)-(D) in FIG. 2B to provide for the low attenuated signed communication directly with BMM 60 on behalf of all OCG signals in DLM 50 where, in such a case, the other VOAs of these other OCG signals in DLM 50 would have their output OCG signals reduced to a negligible level during startup so as not to interfere with the communicating VOA 22 during the DLM/BMM authentication process. Thus, in this embodiment, VOA 59 would not be required for autodiscovery.

With reference to the DLM modules 17 of FIG. 1A or FIG. 3, optical autodiscovery is provided as a way to check the optical connectivity between optical line side cards comprising DLM (A), DLM (B), DLM (C), and DLM (D) for physical and logical correctness, which may be circuit board cards in same equipment chassis or circuit board cards in different chassis. Such as circuit board card may be comprised of a digital line module (DLM), such as DLM 17 or DLM 50, as previously discussed, and an interleaving or banding/disbanding card where groups of multiplexed or WDM signal groups, e.g., OCG (A), (B), (C), and OCG (D) signals, are interleaved or banded to form a resultant banded WDM signal or are deinterleaved or disbanded into WDM signal groups, i.e., OCG signal bands. Optical autodiscovery further provides a method by which the correct optical patching of the optical channel group (OCG) between a DLM 17/50 and a BBM 60 can be verified for physical as well as optical/electrical circuit logical correctness. Optical patching means optical connection of an OCG from a DLM 50 to BMM 60 which is usually handled by an optical cable with its end connectors plugged between these two optical modules.

Reference is now made to FIG. 3 which illustrates further details of the band MUX/DEMUX module (BMM) 60. In the following descriptions well as later description, reference is made to DLMs 17 as optically patched to BMM 60. However, it should be understood that DLMs 17 with DSP controllers 19 may be a plurality of different DLMs 50, each with multiple PIC modules and a DSP controller 58, optically patched to the several input/output ports 42/62 of BMM 40/60 are basically the same except that more detail is shown for BMM 60. Thus, it is to be importantly noted that DLMs 17 with DSPCs 19 in FIG. 3 alternatively may be a perspective DLM 50 with DSP controller 58 illustrated in FIG. 2B where each provide a plurality of OCG signals combined, respectively, as OCG (1), . . . , and OCG(n), with n=4, which are respectively provided to respective BMM ports 62A, 62B, 62C, and 62D. However, as it would be understood by those skilled in the art, n may be any other number, within reason, such as, for example, n=8 or 10. Also, it should be noted that reference to DLMs 17 with DSPCs 19 in FIG. 3 alternatively should be taken to alternatively also mean DLMs 50 with DSP controller 58 illustrated in FIG. 2B.

As seen in FIG. 3, the PIC OCG signals OCG (1), OCG (2), OCG (3), and OCG (4) from DLMs 17 are, respectively, patched to BBM input/output ports 62A, 62B, 62C and 62D. Thus, OCG (A) signal from DLM 17 of FIG. 2A is shown patched to BBM port 62A. The same is true for other DLMs 17, which are, respectively, patched to BMM ports 62B, 62C, and 62D for coupling of combined channel signals OCG (B), OCG (C), and OCG (D) to BMM 60. A small portion of the inputted OCG signals are tapped at photodetectors (PDs) 61 which PDs have a bandwidth to recover the autodiscovery signaling provided by discovery signaling from a modulated light source from a respective DLM 17 such as via its respective modulated VOA 22. The optical-to-electrical discovery signals are received at the BMM DSP controller 63. It should be noted that the bandwidth response of photodetectors 61 does not include the data or client frequency signals of the OCG signal from the DLM 17 which are in the GHz range but rather are only responsive to the lower frequency modulation of the modulated identification signal that is superimposed on the OCG signal.

Thus, for example, if an aggressor DLM (C) is patched to BMM input/output port 62C, a modulated signal from its respective output VOA 22 may be received at BMM 60 via photodetector 61C that identifies the DLM and its OCG signal. The BMM DSP controller 63 may contain information in memory as to what DLM and optical channel group (OCG) is proper for its particular input/output port 62C. If a different DLM 17 than the DLM and OCG signal expected is patched to port 62C, then BMM 60 will reject it as explained in further detail later on. The other signal taps 91A, 91B, 91C, and 91D are for monitoring input power of the respective DLMs 17 after autodiscovery has been achieved where the input power levels of OCG (1), OCG (2), OCG (3), and OCG (4) are substantially made equal to one another via operation of their respective output attenuators, such as VOAs 22 in FIG. 2A, as discussed in patent application Ser. No. 11/425,988, filed Jun. 20, 2006, supra.

On ingress of BMM 60, OCG (n) pairs, such as alternate pairs OCG (1) and OCG (3); and OCG (2) and OCG (4), respectively, are banded together via input band multiplexers 64A and 64B. Thus, two band MUXs 64A and 64B provide together two OCG interleaved signals. In this way, the groups of channel wavelengths are banded together as a banded signal. Then, the two banded signals from band MUXs 64A and 64B are multiplexed together at a 2:1 multiplexer 66 and passed through a band booster amplifier 68, e.g. EDFA or other optical amplifier. An optical service channel or optical supervisory channel (OSC) signal may, then, be added to the amplified signal via OSC filter 70, which multiplexes the OSC signal from OSC transmitter 71 to the amplified combined and banded signal from amplifier 68. OSC transmitter 71 is in communication with BMM control processor 63. Other banded signals from other wavelength bands, such as, for example, from the L band if, for example, BMM 60 here is a designed for C band signals, may be also added to the composite signal at C/L filter 72. A 2% tap 74 provides an output to a monitoring photodetector (not shown). The banded signal is then provided to an optical link via BMM output 76.

The receiver side of BMM 60 shown in FIG. 3 generally contains some similar optical components as the transmitter side except that they are, of course, operative in a reverse mode. A banded composite signal at BMM input 78 from an optical link or line is received first by C/L filter 80, via monitoring tap 79 (coupled to a photodetector which is not shown), where other signal bands, such as L band signals, if the BMM 60 of FIG. 3 is designed for the C band, are demultiplexed from the incoming composite signal. The remaining C band composite signal may then pass through an attenuator 82 to reduce the signal power level, if required, to a level where the downstream band booster amplifier 86 operates to provide optimum gain to the composite signal. Next, any OSC signal in the composite signal is demultplexed from the banded signals at OSC filter 84 and the OSC signal is received and detected at OSC receiver 85. OSC RX 85 is in communication with BMM control processor 63. After the banded signal is amplified by band booster amplifier 86, e.g., an EDFA, the DLM banded composite signal is disbanded at deinterleaver 85 into two OCG banded signals. The disbanded signals are then demultiplexed at band DEMUXs 90A and 90B into OCG signal pairs, OCG (A) and OCG (B), and OCG (C) and OCG (4D). The optical channel group (OCG) signals OCG (A), OCG (B), OCG (C), and OCG (D) are provided to their respective DLMs, i.e., DLM (A), DLM (B), DLM (C), and DLM (D) via BMM input/output ports 62A, 62B, 62C, and 62D, as shown patched in the embodiment of FIG. 3.

BMM control processor 63 handles functions on the BMM board as well as plays a role in the optical autodiscovery procedure set forth below in more detail.

Figure 4:
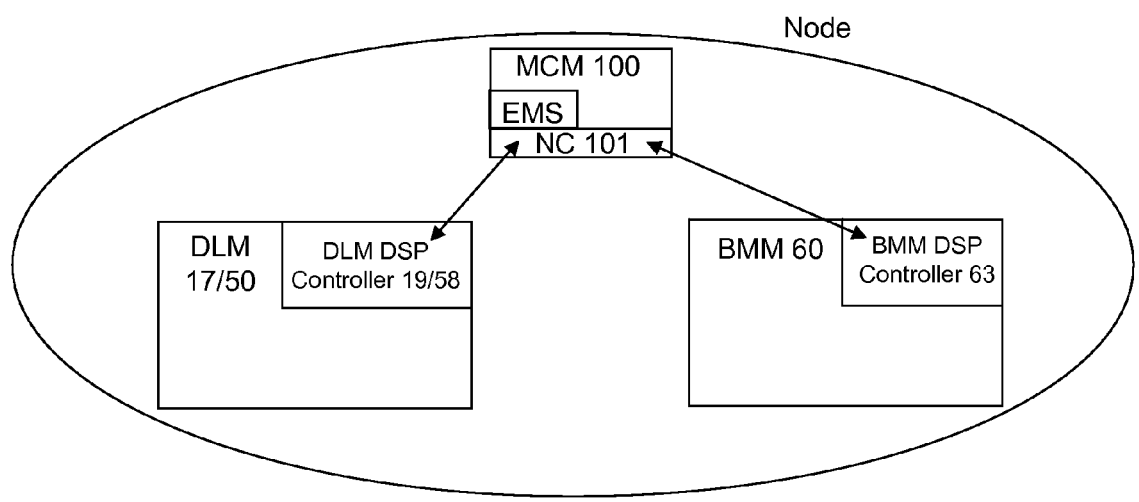
FIG. 4 is an upper level schematic illustration of a network element controller comprising a management/control module (MCM) that controls, among other events and actions, direct communication between a DLM and a BMM.

While there are many approaches to how the control and management can be accomplished among various modules and line cards making up network element equipment, the control methodology illustrated in FIG. 4 may be followed as an example. Here, network element controller (NC) 101 in management and control module (MCM) 100 is in communication with the DSP controllers 19 in each of the electro-optic DLMs 17 and a BMM 60 at the network element. Also, there the element system management (ESM) which is the software that operates MCM 100 to coordinate control and communication functions among and between DLM DSP controller 19 and BMM DSP controller 63 via network element controller (NC) 101 of MCM 100.

Optical autodiscovery provides the following protection against system fault conditions. First, for example, if a technician or operator optically cables or connects a second DLM 17 (the "aggressor") to the incorrect BMM input/output port 62, the second, aggressor DLM 17 OCG signal output is initially attenuated significantly so that its resultant output is sufficiently low in power so as not to be disruptive to an OCG signal of a first DLM (the "victim") previously patched and provisioned to the same BMM 60. Thus, optical auto discovery prevents an aggressor DLM 17 from possibly generating any coherent crosstalk with a patched and operating victim DLM 17, particularly where the aggressor DLM 17 includes an OCG signal having at least one identical wavelength which already exists in a previously patched OCG signal of the victim DLM 17.

Second, if the technician or operator optically patches an aggressor DLM 17 to a BMM 60, whether to a correct BMM port 62 or not, and such a connection is in conflict with currently desired provisioning, then, again, the aggressor DLM OCG output is attenuated so that its resultant output is sufficiently low in power as not to be disruptive threat of any previously provisioned victim DLM OCG of a victim DLM OCG in the future. This prevents the aggressor DLM from being brought into service in a configuration that differs from that which was intended to be provisioned through MCM 100 and BMM 60.

Thus, protection to an already provisioned DLM or DLMs 17 is achieved by attenuating the overall optical channel group (OCG) output power of an aggressor DLM 17 to be patched an provisioned to a BMM 60, whether the aggressor DLM 17 is provisioned with one TxPIC module, as illustrated in FIG. 2A, or the aggressor DLM 50 is provisioned with multiple TxPIC modules, as illustrated in FIG. 2B. In either case, the OCG power output is attenuated to a non-destructive power level via VOA 22 or VOA 59 of these DLMs, as the case may be. Therefore, the attenuated output of the aggressor DLM 17 does not substantially interfere with already existing and another operational optical channel group (OCG) of a victim DLM 17 previously patched to the same BMM 60. The optical channel group (OCG) being patched includes an optical low frequency modulated ID signal, which is separated spectrally separated significantly from the OCG signal bandwidth of signals being transmitted. The low frequency signal is representative of an ID tag for the particular OCG signal and the signal is modulated with information identifying the DLM 17 as well as its particular OCG being ported to a particular BMM input/output port 62. Thus, optical discovery process specifically identifies the particular transmitting, aggressor DLM being optically cabled to a particular BMM port 62. This OCG signal ID tag is detected at BMM input/output port 62 via input photodetector 63, and the resultant electrical signal is decoded at the BMM DSP controller 63. In response to this signal, controller 63 provides either an acceptance signal to the aggressor DLM 17 via an electrical communication signal, either directly or via network element controller 101 or, on the other hand, raises an alarm to an operator that the aggressor DLM 17 is either an incorrect OCG signal group and DLM, or is patched to an incorrect BMM input/output port 62. If the physical connectivity made is accepted by BMM 60, then, as just indicated above, an acceptance is reported to the aggressor DLM 17, which may be an electrical signal or return optical signal. Thus, if the detected DLM/BMM optical port association matches the pre-provisioned association in memory at BMM DSP controller 63, or if auto-provisioning is enabled, the aggressor DLM 17 being patched to BMM 60 is then enabled by BMM DSP controller 63 for power output turned up from its initial lower, attenuated power level, which is accomplished through reduction of applied negative bias to DLM output VOA 22, permitting a full power OCG signal output from the aggressor DLM. Therefore, DLM signal operation with BMM 60 is allowed to proceed by transmission of an OCG signal from the now accepted DLM which is no longer an "aggressor". The foregoing procedure is explained in further detail later on with respect to the flow chart set forth in FIG. 6.

Figure 5:
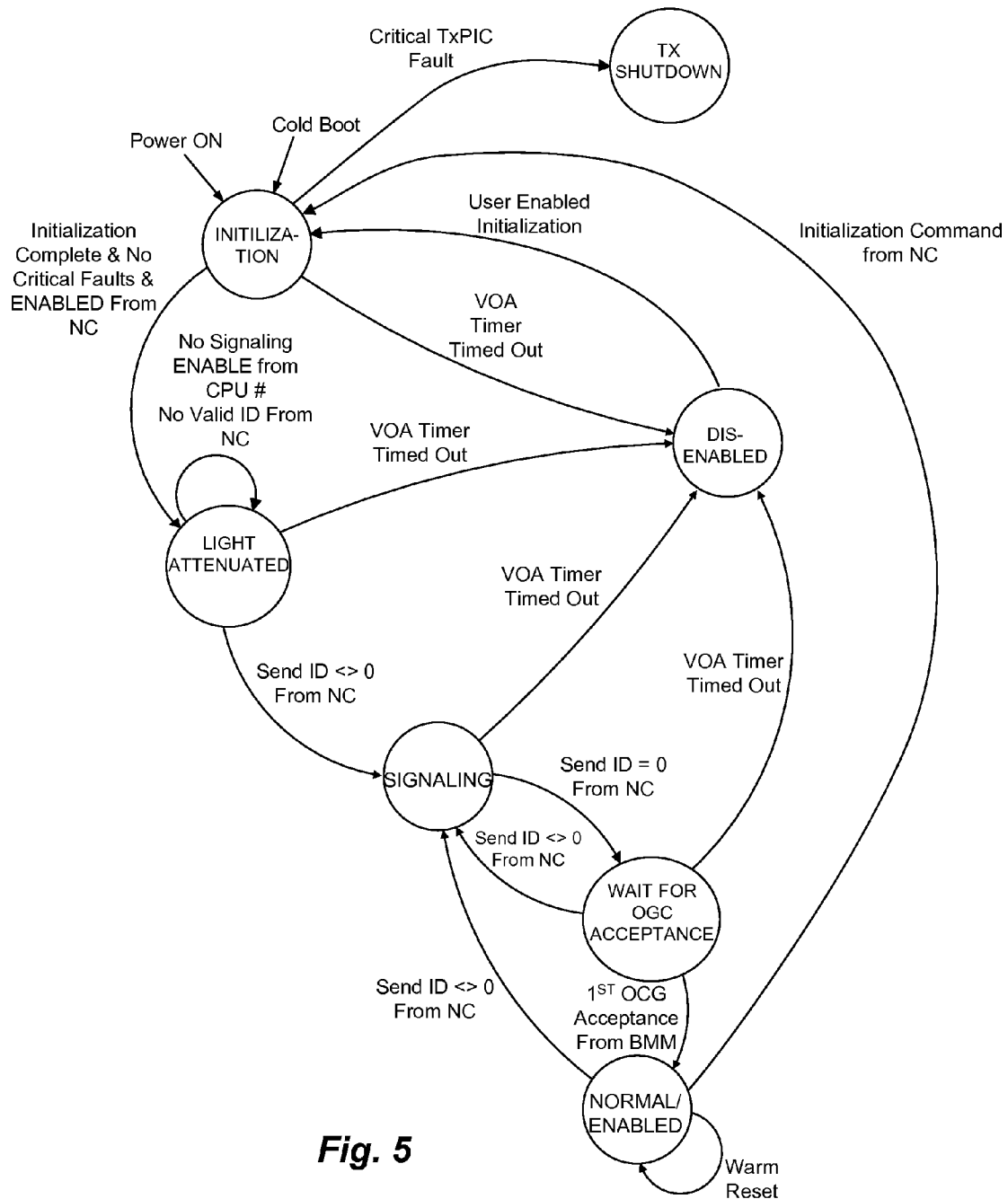
FIG. 5 is a state diagram of the enabled states between a DLM and a BMM upon optically patching the former to the latter.

The respective BMM ports 63 are sequence through the operational states during optical autodiscovery illustrated in the state diagram of FIG. 5. FIG. 5 shows the DLM-to-BMM port state machine, which is maintained by DLM DSP controller 19 and BMM controller 62. The state definitions are useful in understanding the operation of this disclosure but are not necessarily sequentially followed as shown in FIG. 5 and all states shown are not necessarily included in an implementation of optical autodiscovery. However, these states, or their equivalents, must be maintained by DSP controller 19 because, in some cases, such states must persist through, for example, a PIC module processor (CPU) 36A reboot process (FIG. 1). As shown, the signaling states can only be entered into when a DLM DSP controller 19 of an aggressor DLM 17 has provided a valid DLM ID to BMM 60 enabling autodiscovery. An autodiscovery initiation may first be started with a signal from DLM controller 19 to the PIC DSP Controller 36 after a DLM processor reboot for autodiscovery has been initiated to determine PIC module status. If the DLM DSP controller 19 detects that the PIC module processor 36A in a "down" condition, it must first clear any existing enabled state.

The states in FIG. 5 are described as follows:

INITIALIZATION—In this state, the TxPIC 10 in PIC module (A) has not yet completed stabilization, which is referred to as DLM TURNUP and, therefore, the module is not ready to be put into service. From the standpoint of this discussion, a "catastrophic" fault is one that prevents further turnup. It should be noted that all fault types do not necessarily prevent further turnup. For example, a subset of TxPIC lasers 14 on a TxPIC 10 may have failed but initialization is allowed to proceed because the remaining and operating TxPIC lasers 14 are wavelength locked and are operating within the correct power range. Such a fault prevents the DLM 17 from exiting the initialization state. During initialization, VOA 22 in DLM 17 is set to its lowest rated attenuation level. That level is dictated by being sufficiently high in its attenuation to prevent disruption of an existing transmitting or victim DLM but still sufficiently low in its attenuation so as to allow enough optical power to be coupled to the BMM so that BMM photodetectors 61 are bale to detect the optical signal provide via modulated VOAs 22.

LIGHT BLOCKED—The TxPIC module (A) is fully initialized and is transmitting a modulated waveform at the correct (open OCG loop) power and (closed loop) wavelength. The VOA 22 or 59 at an aggressor DLM 17 output is set to the maximum rated attenuation level in this state, which level is one that will not provide an OCG signal to a BMM 60 that would optically interfere with previously patched and enabled DLMs.

SIGNALING—This state is the same as LIGHT ATTENUATED state except the aggressor DLM VOA 22/59 is being used to amplitude modulate the overall OCG signal with a DLM ID message, which is repetitively sent to BMM 60. The DLM ID uniquely identifies the particular aggressor DLM 17 and its associated OCG signal output, such as, but not limited to, by its manufacturing serial number. The identification here is, therefore, of a serial number of a particular DLM which identifies to a second optical module, such as a BMM, that the connected or patched DLM is connected to the correct BMM. Such identification could include the particular OCG signal type, such as in the C band or the L band, but OCG identification can be determined by inspection via software to determine which OCG type is configured with respect to a particular DLM. It should be noted further that the identification to be made here is that of the particular DLM unit 17, but it is also within the scope of this disclosure that the ID tags can be, respectively, provided for several different PIC modules (A), (B), (C), and/or (D) included in a single DLM 50 of FIG. 2B with each having its own respective ID rather than one DLM ID tag representing a tag for all the PIC modules (A), (B), (C), and (D) associated with a particular DLM 50.

WAIT FOR OGC SAMPLE—In this particular state, VOA 22/59 of the aggressor DLM 17/50 is set to a low attenuation level and is waiting for the event of a first OCG acceptance from BMM 60.

NORMAL/ENABLED—In this state, BMM 60 has accepted the aggressor DLM 17 as legitimate and its VOA 22 in this state is set to its operational range and is employed via an OCG power control loop to set the OCG signal power at the respective BMM port 62 to normal full power condition by removing the attenuation of VOA 22.

DISABLED—TxPIC lasers 14 are powered down and VOA 22/59 is set to a low attenuation level if a VOA timer has timed out. This is basically a "bottom" state of the state diagram of FIG. 5.

TX SHUTDOWN—A critical fault has been detected that causes TxPIC 10 to be disabled, such as, for example, incorrect bias on laser heaters 13 on TxPIC 10, incorrect bias current provided to TxPIC lasers 14 and/or a PIC thermoelectric controller (TEC) to control the temperature of TxPIC 10 (not shown) is not a correct setting.

In summary, therefore, if an aggressor DLM 17 is erroneously patched to an incorrect BMM port 62, which BMM is already handing banded optical signals via other BMM ports 62, optical interference may be incurred with other OCGs already provisioned through the other BMM input/output ports 62 if one or more OCG identical wavelengths of an aggressor DLM 17 are the same wavelengths in the provisioned OCGs. Since BMM 60 is provided with no mechanism for blocking an OCG input provided at a port 62, the in-error OCG input from such an aggressor DLM 50 is first attenuated at the aggressor DLM 17 to an optical level, via DLM VOA 22, that would fail to provide any possible optical interference with any provisioned OCG. Once there is verification by BMM 60 that the particular DLM port connection is correct and the OCG of the patched aggressor DLM 17 is deemed correct, the attenuation initially placed on the DLM OCG signal via DLM VOA 22 is lowered to permit the OCG output from the patched aggressor DLM to be placed at its normal operating optical signal level for input via its provisioned port 62.

The autodiscovery sequence must be performed at a BMM port 62 whenever proper physical connectivity is in question. Such cases may be when either a BMM 50 or a DLM 17 is separated from the equipment chassis, or where DLM 17 or BMM 60 is power cycled or rebooted, or where DLM 17 or BMM 60 is power enabled for a first time and the BMM has detected a lack of clock synchronization, or where a technician or operator has manually called for a forced autodiscovery restart which is exemplified later in FIG. 6. After the autodiscovery signal is transmitted from a DLM 17 to a BMM 60, via a BMM port 62, transition to the NORMAL/ENABLED state may additionally require that the DLM/BMM association created by the optical cabled connection is provisioned with the aid of the management and control module (MCM) 100. In this case, a DLM ID received by a BMM 60 via input photodetector 61 is verified at the BMM against a correct DLM ID held in MCM memory. However, the correct DLM ID may also, instead, be held in memory at BMM DSP controller 63 to be provisioned to a particular BMM, which DLM ID information, when required, is then downloaded to the BMM.

Successful completion of autodiscovery for DLM/BMM patching for transport of a given OCG DLM output requires that DLM DSP controller 19, BMM DSP controller 63 and network element controller (NC) 101 are all active and executing operational software. Network element controller (NC) 101 can be on a different shelf in an equipment chassis so that it is coupled through backplane cables to BMM DSP controller 63 and DLM DSP controller 19. The active network element controller (NC) 101 may be responsible for validating the received DLM ID at BMM 60 and then authorizing the transition to the NORMAL/ENABLED state in FIG. 5. A time window exists, such as one or more seconds, between the time BMM DSP controller 63 reports the received DLM ID and the time that DLM 17 turns up power across the channel laser array in TxPIC 10 and BMM 60 then enables the opening of BMM port 62 undergoing identification and acceptance. If an aggressor DLM 17 is erroneously plugged into a BMM port 62 on BMM 60, signal power above a predetermined level will be detected and BMM DSP controller 63 will issue an alarm to a technician or operator. If BMM DSP controller 63 detects a loss of power condition at a BMM port 62 that is operating in the NORMAL state, then, the pre-existing DLM ID for that port will be invalidated and BMM 60 will inform MCM network element controller (NC) 101 of this condition which will then cause disablement of such an apparently now unconnected DLM.

An example of the sequence of events for autodiscovery activation relative to authentication occurring at MCM 100 rather than by BMM 60 through its own authentication processes is as follows. First, a DLM 17 is powered up and initialized. Second, a BMM 40/60 is powered up and initialized. Third, network element controller (NC) 101 is power up and initialized. Fourth, a desired DLM/BMM association is provisioned via the management software in MCM 100. One type of provisioning is called pre-provisioning which is a key provisioned via the management software in MCM 100 as to what DLM is to be linked to what BMM and which DLM should be expected at one of its BMM ports 62 including the DLM OCG that it should expect. The other type of provisioning is called auto-creation, where neither the management software nor an operator performs the provisioning. Rather, a particular BMM port does not have any particular DLM identification associated with it but the BMM identifies an OCG type that will acceptable at a given BMM port. Thus, the BMM will accept any DLM at a given BMM port provided that the OCG type (a given C band group or L band group, for example) of the DLM matches the OCG type that the BMM expects at that given port. Once an acceptable OCG type of a patched DLM is present, no other DLM is permitted to be patched to that given port even if of the same OCG type. Of course, the same OCG would not be permitted at another BMM port of the same BMM. Fifth, the correct OCG cable from the aggressor DLM 17 is installed to the correct BMM DLM port 62 by an operator. Both the DLM and BMM DSP controllers 19 and 63 are booted and receive provisioning data via network element controller (NC) 101 from MCM 100. Once both DLM 17 and BMM 60 are ready for autodiscovery, network element controller (NC) 101 directs DLM 17 to transmit its unique DLM ID via low frequency modulation from modulator 24 superimposed on its attenuated OCG signal at VOA 22. It should be clear to those skilled in the art that all laser source channels need not necessarily be contributing to the OCG signal output during this low frequency ID signal modulation.

The DLM ID is then detected at a given BMM port 62 and received by BMM controller 63. BMM DSP controller 63 then forwards the DLM ID to network element controller (NC) 101. At MCM 100, the BMM/DLM association based upon the received DLM ID is checked via a provisioning database that may be part of MCM 100 to determine if there is a correct association and match for BMM 60 with the aggressor DLM 17. If provisioning is affirmative, then, network element controller 101 forwards to BMM DSP controller 63 the proper DLM address. This address then authenticates that the proper DLM has been associated with a proper BMM 60. Then, BMM 60 provides a nominal value for the OCG signal power to the now accepted DLM 17 and the accepted DLM begins to transmit the DLM OCG signal at the proper power level in support of a per OCG power control procedure set forth in patent application, Ser. No. 11/425,988, infra.

Upon any subsequent reboot of the DLM DSP controller 19, no new exchange of authentication is necessary as long as DLM controller 19 is already in the NORMAL/ENABLED state in FIG. 5. If it is not, the DLM DSP controller 19 is directed to restart the initialization sequence again, at the conclusion of which the autodiscovery sequence. Since BMM 60, at this point of time, will detect a loss-of-light condition at an associated BMM port 62 due to such an initiated DLM reboot, BMM DSP controller 63 will automatically invalidate the particular BMM port 62 and is ready to accept a new DLM ID address from the DLM upon its re-activation.

In the case of BMM DSP controller reboot, BMM DSP controller 63 checks for the occurrence of a loss-of-light condition on any one of the BMM ports 62. If a loss-of-light condition is detected for a port, no action is necessary since the optical connectivity is known to have been preserved, i.e., if the condition of NORMAL/ENABLED existed at the time of BMM reboot, then that state is known to have persisted by BMM DSP controller 63 before its reboot. If the loss-of-light has occurred, BMM DSP controller 63 invalidates the DLM ID previously received by it and restarts an ID capture sequence while also notifying MCM 100 of this course of action. The MCM network element controller 101, in turn, also informs the DLM 17 that was previously provisioned or is to be autoprovisioned now for the particular BMM port 62 and is directed to restart optical autodiscovery signaling procedure.

After BMM 60 successfully receives and accepts a DLM ID and DLM 17 is authorized to transition to NORMAL/ENABLED state, then a timer at BMM DSP controller 63 is commenced and if, during a predetermined time interval of the BMM timer, the maximum or high power level of the DLM OCG signal is not detected at the provisioned BMM port 62, then, BMM controller 63 directs the DLM DSP controller 19, such as through electrical signaling to the DLM 17, to transition back to the SIGNALING state in FIG. 5 and restart the autodiscovery sequence.

Another way of accomplishing optical autodiscovery is through the deployment of out-of-band wavelength signals to do the optical autodiscovery procedure. Such a different wavelength signal is separate from the DLM OCG signal group but may be multiplexed, for example, with the OCG signal. Since the separate ID signal is an out-of-band signal, it will not harm working or provisioned OCG signals previously provisioned to the BMM since the optical autodiscovery signal wavelength is out of the data signal bandwidth, such as the C band or L band, for example. These optical autodiscovery signals can alternatively be generated by an additional laser or on-chip laser or LED in a DLM 17/50 or on a TxPIC 10. In the case of a laser, for example, its modulated "discovery" frequency for autodiscovery would not be in the frequency range of the data carrying optical frequencies of the OCGs. However, this approach employing separate optical signals may be more expensive than the embodiment discussed above relating to deploying low frequency modulated signal placed on an attenuated OCG signal from an aggressor DLM 17 to be patched to BMM 60.

Figure 6:
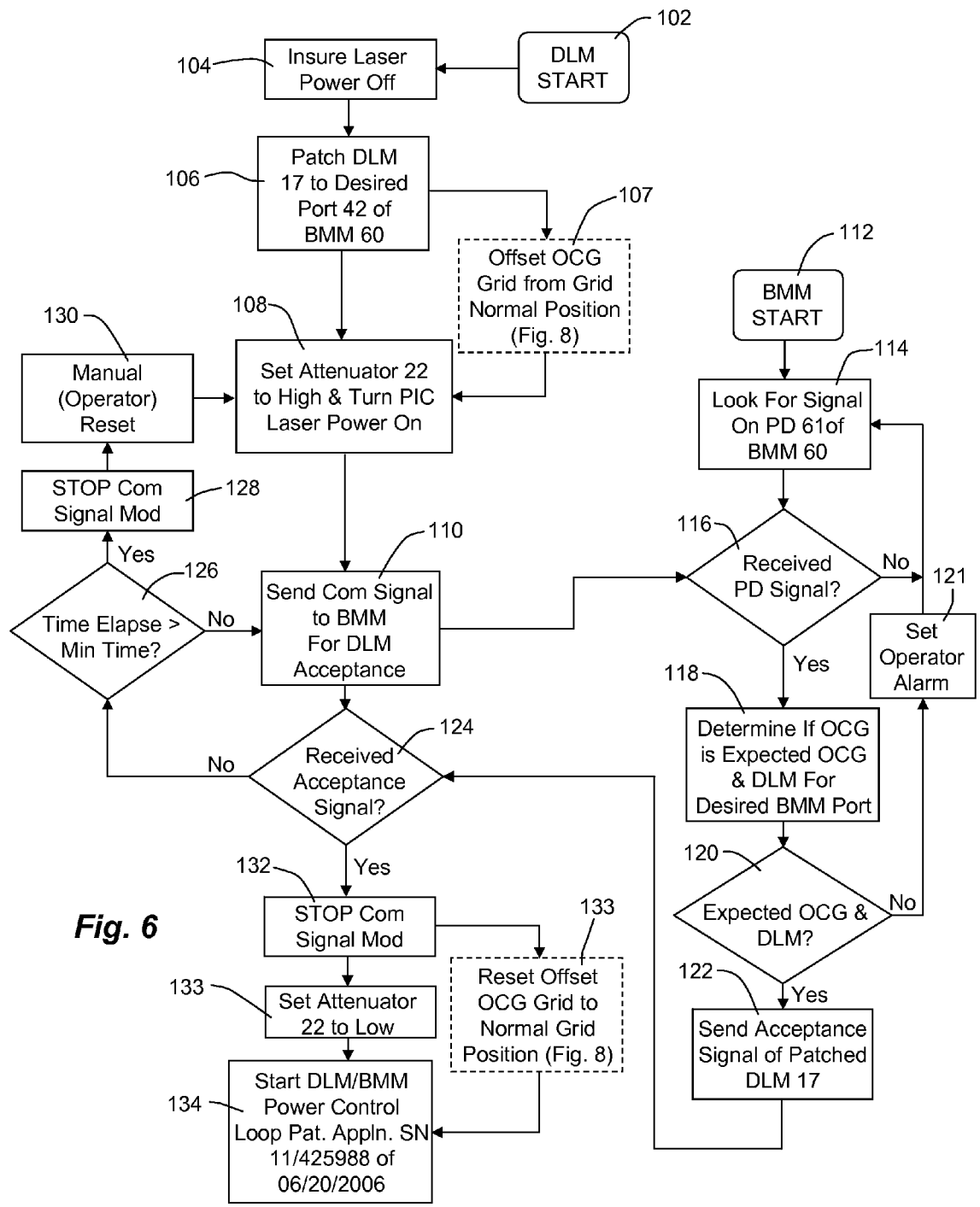
FIG. 6 a flow diagram of the communication procedure between a DLM and a BMM upon patching the former to the latter.

Reference is now made to FIG. 6 which illustrates a flow diagram of the autodiscovery communication that occurs between DLM 17 and a BMM 60. As seen FIG. 1, VOA 22 is couple to a low frequency modulator (LF MOD) 24 so that DLM DSP controller 19 provides an optical DLM ID signal to BMM DSP controller 63, via a BMM port 62 and PD 61, which signal identifies the DLM and its particular optical channel group or OCG to controller 63. In FIG. 6, DLM 17 at START 102 first insures that the power to lasers 14 in TxPIC 10 is off as indicated at step 104. Next, at step 106, DLM 17 is patched to a desired BMM port 62 of a respective BMM 60, which particular port is identifiable by BMM DSP controller 63 through a DLM ID signal received through a particular input photodetector (PD) 61A, 61B, 61C, or 61D. As seen at step 108, the DLM attenuator 22 is then set HIGH so that minimal power is permitted at the DLM output followed by turning on of TxPIC laser power. Next, as shown at step 110, a communication signal is sent from the patched, and now aggressor, DLM 17, via a modulated signal from LF MOD 24 and superimposed of the attenuated OCG signal to BMM DSP controller 63, through input photodetector 61, identifying the particular DLM 17 and its associated OCG within the signal band, such as a sub-band in the C band or L band.

In the meantime, at BMM 60 beginning at START 112, BMM controller 63 is looking for a DLM ID signal on an associated photodetector 61 as it scans across the photodetector outputs. Controller 63 in this case may cycle through each of the respective photodetector outputs that have not yet been authenticated to determine if an aggressor DLM is now possibly patched to an aggressor DLM. As seen at step 116, if a communication signal has not been received from the aggressor DLM 17, BMM controller 63 continues to look, per step 114, until such a signal is received, at which time a determination is made, per step 118, as to whether the DLM ID received from the aggressor DLM 17 is the expected OCG and DLM at the particular BMM port 62. If it is not the expected DLM and associated OCG, as determined at step 120, then an alarm is sent to the operator, as depicted at step 121, indicative of an incorrect patching of the aggressor DLM 17. On the other hand, as seen at step 120, if BMM authenticates that the DLM and its associated OCG signal are those expected at the particular BMM port, then, BMM DSP controller 63 at step 122 dispatches an acceptance signal to the aggressor DLM 17. This signal may be, for example, an electrical signal sent to the aggressor DLM 17 via network element controller 101. At the DLM side, if the acceptance signal is received at step 124, then, the LF MOD 24 is stopped, as seen at step 132, followed by the setting of the attenuator 22 or 59 to LOW at step 133 so that the operation of PIC lasers 14 in TxPIC 10 can be set to full power condition, followed by the commencement of the power control loop between the DLM and the BMM as described in copending and incorporated patent application, Ser. No. 11/425,988.

During step 110, DLM LF MOD 24 continually sends its request for identification to BMM 60 during a predetermined time period. This is represented by step 124 where no acceptance signal has been yet received and at step 126, the predetermined minimum time period has not yet elapsed (condition "no") so that the DLM ID signal is repeated at step 110. Thus, the DLM 17 continues sending its identification request at step 110 until an acceptance is received from BMM 60 at step 124. If, on the other hand, an acceptance signal is not received from BMM 60 within the predetermined minimum time period at 126, such as, for example, but not limited to, a ten minute period of time (condition "yes"), then the DLM LF MOD 24 is stopped, as indicated at step 128, and a operator manual reset is required before resignaling from the aggressor DLM 17 to BMM 60 is carried out again via steps 108 and 110. This also permits the operator to check for any errors in patching an incorrect DLM to a particular BMM port or patching a correct DLM to an incorrect BMM port.

Figure 8:
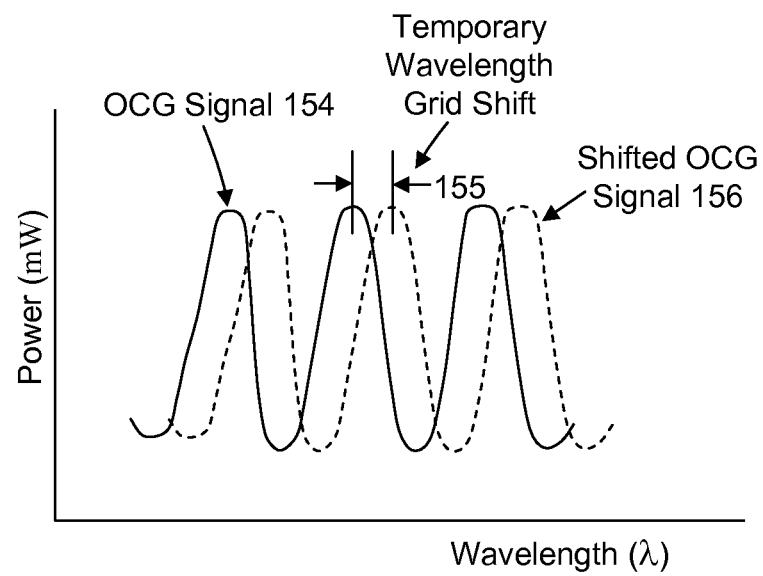
FIG. 8 is a graphical illustration of a DLM temporary OCG wavelength grid shift from its normal or standardized (ITU) wavelength grid to aid in reduction of BER penalty as illustrated in FIG. 7.

A still further way of accomplishing optical autodiscovery is an embodiment of detuning the wavelength grid of a TxPIC module so that its output OCG signal wavelength grid is frequency shifted in a manner as illustrated in FIG. 8 where three signal wavelengths are illustrated out of N such signal channels on a TxPIC 10. By temporarily shifting the wavelength grid of the OCG signal 154 so that the wavelength grid is detuned from the standardized wavelength grid, such as the ITU grid, to a shifted OCG wavelength grid 156 by a shifted spectral amount indicated at 155. With this shifted signal grid at 156, the OCG signal can now be provisioned without any attenuation since none of its output wavelengths, forming part of the aggressor DLM shifted OCG would interfere with any other signal wavelengths on other previously provisioned victim DLMs since the detuned or shifted signal wavelength grid at 156 is no longer wavelengths on any standardized wavelength grid, such as the ITU grid. As a result, the TxPIC VOAs 22 may not be further necessary in the execution of the autodiscovery procedure as set forth in FIG. 6. However, they would be necessary, for example, in carrying out active control loop for power control of OCGs being patched to the same BMM, for example, as set forth in incorporated patent application, Ser. No. 11/425,988, infra. Such a detuning can be either a red shift or blue shift of the PIC wavelength grid. Once authentication is complete, the OCG shifted wavelength grid 156 is shifted back to its proper standardized wavelength grid position at 154. This embodiment would require that no wavelength locking be active on the TxPIC module during the time of wavelength grid shifting in order to safely accomplish the autodiscovery process.

Figure 7:
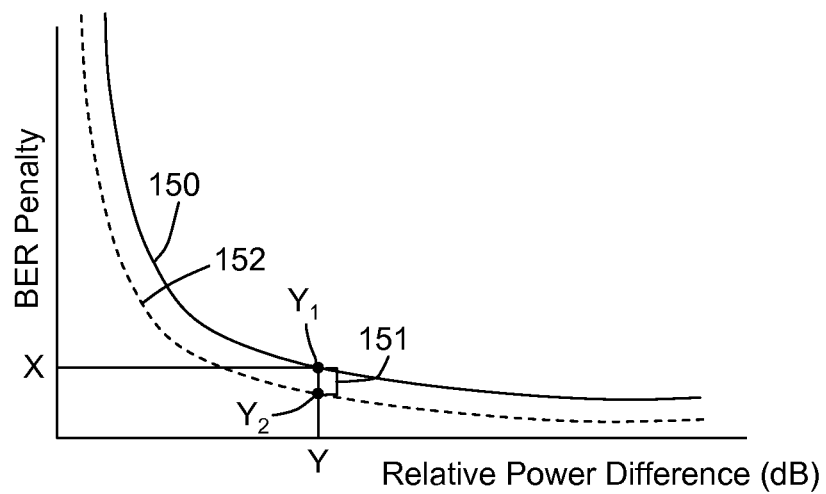
FIG. 7 is a graphical illustration of BER penalty versus relative power difference between an operating OCG of an aggressor DLM patched to an input/output port of a BMM where there is temporary wavelength grid shift imposed on the OCG standardized wavelength grid of the aggressor DLM.
Figure 9:
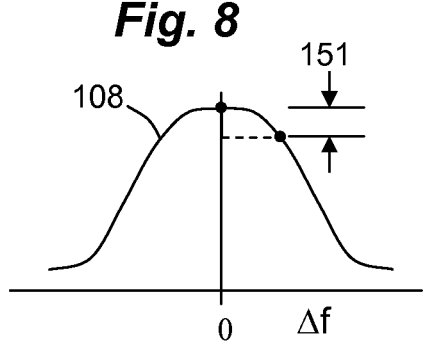
FIG. 9 is a graphical illustration of interference penalty versus frequency offset or shift to illustrate how a reduction in BER penalty occurs due to a temporary OCG wavelength grid shift as depicted in FIG. 8.

Furthermore, due to the fact that the OCG wavelength grid 154 is detuned as illustrated in FIG. 8, also a reduced BER penalty will be experienced as illustrated in connection with FIGS. 7 and 9. The solid line curve 150 in FIG. 7 illustrates the BER penalty experienced over a range of relative power differences between a victim DLM at full power OCG signal output and an aggressor DLM at attenuated power OCG signal output over a given range of power. As illustrated in FIG. 9, this relative power difference is what is experienced before there is any imposed temporary wavelength grid shift of OCG signal 154 so that the interference penalty shown at curve 108 in FIG. 9 is at its highest point where the BMM provisioned victim DLM would experience peak interference due to a presence of optically conflicting aggressor DLM OCG channels. It can be readily seen that by shifting the wavelength grid 154 of an aggressor DLM to be patched to a BMM port, the interference penalty is reduced by an amount 151 shown in FIG. 9, which also reduces the BER penalty as depicted by dash lined curve 152 in FIG. 7 by the same amount 151 from a higher BER penalty at position $Y_1$ to a lower BER penalty at position $Y_2$. This is an additional advantage in deploying this wavelength grid shift of the DLM OCG output signal 156 which can be accomplished in the aggressor DLM by shifting all of the tuned wavelengths of TxPIC lasers 14. For example, this shifted wavelength grid can be initiated by applying additional heat uniformly across heaters 13 of the entire PIC laser array of TxPIC 10. In FIG. 6, the step of the offset of the aggressor OCG wavelength grid to position 156 is depicted at step 107 and the reset of that offset back to the standardized wavelength grid to position 154 is depicted at step 133. Again, the set attenuator High at step 108 and set attenuator Low at step 133 may be eliminated, if desired.

While the invention has been described in conjunction with several specific embodiments, it is evident to those skilled in the art that many further alternatives, modifications, and variations will be apparent in light of the foregoing description. For example, the exemplified communication discussed in this disclosure is explained in connection with a digital line module or DLM seeking recognition and acceptance via a low frequency modulation signal, by a band multiplexer module or BMM. However, it will be evident to those skilled in the art that the exemplified optical autodiscovery procedure in FIG. 6 can be adopted between any two optical or electro-optical modules in any kind of system where a first (aggressor) optical or electro-optical module seeks recognition and acceptance by a second optical or electro-optical module upon their mutual optical connection or coupling and there is a concern that the first optical or electro-optical module may materially affect the successful connection of previously connected or provisioned (victim) optical or electro-optical module to the same second optical or electro-optical module. Further, the communication between the first and second modules may be all electrical modulated messaging, partly electrical and partly optical modulated messaging as is the case in the foregoing embodiments, or all optical modulated messaging. All optical messaging is not necessary in the foregoing embodiments since there is no provisioning of optical signals from a BMM to a DLM because the provisioning of received and disbanded OCG signals for output to respective DLMs has already been provisioned for the same OCG signals to be properly patched to the BMM.

Thus, the invention described herein is intended to embrace all such alternatives, modifications, applications, and variations as may fall within the spirit and scope of the appended claims.

We claim:

1. A method for identifying a first optical module that provides an optical signal to a second optical module, the optical signal comprising a plurality of channel signals, each of which having a corresponding one of a first plurality of wavelengths, each of the first plurality of wavelengths having a corresponding one of a first plurality of wavelength values, which conform to a first wavelength grid, comprising the steps of:

connecting a first optical module to the second optical module with a waveguide;
supplying an optical signal from the first optical module, the optical signal comprising a plurality of channel signals from the first optical module to the second optical module, each of which having a corresponding one of a first plurality of wavelengths, the first plurality of wavelengths conforming to a first wavelength grid;
shifting spectrally each of the plurality of channel signals, such that each of the plurality of channel signals has a corresponding one of a second plurality of wavelengths, the second plurality of wavelengths conforming to a second wavelength grid;
modulating at least one of the plurality of channel signals of the optical signal with information identifying the first optical module to provide a modulated optical signal;
ascertaining at the second optical module from the modulated optical signal whether the first module is expected module to supply the optical signal; and
sending an acceptance signal from the second optical module to the first optical module if the first optical module is the expected module; and
shifting spectrally each of the plurality of channel signals, such that each of the plurality of channel signals has the corresponding one of the first plurality of wavelengths, after receipt of the acceptance signal by the first optical module.

2. The method of claim 1 comprising the further step of sending an alarm from the second optical module to an operator if the first optical module is not the expected module.

3. The method of claim 1 wherein each of the plurality of channel signals is generated by a corresponding one of a plurality of sources, the step of shifting spectrally each of the plurality of channel signals, such that each of the plurality of channel signals has a corresponding one of the second plurality of wavelengths includes changing a temperature of each of the plurality of sources.

4. The method of claim 1 further comprising a step of monitoring at the first optical module over a predetermined time period to determine that the acceptance signal has been received.

5. An optical communication system, comprising:
a first optical module providing a first optical signal at an output, the first optical signal comprising a plurality of channel signals, each of the plurality of channel signals having a corresponding one of a first plurality of wavelengths;
a second optical module having an input port for receiving the first optical signal;
a waveguide that supplies the first optical signal to the second optical module;
circuitry configured to spectrally shift the plurality of channel signals, such that each of the plurality of channel signals has a corresponding one of a second plurality of wavelengths;
a modulator that modulates the first optical signal with a second signal including information identifying the first optical module; and
a controller that receives the second signal to determine if the first optical module is an expected module to provide the first optical signal.

6. The optical communication system of claim 5 wherein the circuitry includes a heater.

7. The optical communication system of claim 6 wherein the optical communication system includes a plurality of sources, each of which supplying a corresponding one of the plurality of channel signals, the heater being configured to adjust a temperature of each of the plurality of sources.

8. The optical communication system of claim 5 wherein when the first optical module is an expected module to supply the first optical signal, the circuitry is configured to spectrally shift the plurality of channel signals, such that each of the plurality of channel signals has a corresponding one of the first plurality of wavelengths.

\* \* \* \* \*